United States Patent
Zhao (10) Patent No.: US 11,354,017 B2
(45) Date of Patent: Jun. 7, 2022

(54) DISPLAY METHOD AND MOBILE TERMINAL

(71) Applicant: VIVO MOBILE COMMUNICATION CO., LTD., Guangdong (CN)

(72) Inventor: Junjie Zhao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/976,048

(22) PCT Filed: Feb. 15, 2019

(86) PCT No.: PCT/CN2019/075184
§ 371 (c)(1),
(2) Date: Aug. 26, 2020

(87) PCT Pub. No.: WO2019/169991
PCT Pub. Date: Sep. 12, 2019

(65) Prior Publication Data
US 2021/0200432 A1 Jul. 1, 2021

(30) Foreign Application Priority Data
Mar. 5, 2018 (CN) .......................... 201810179182.1

(51) Int. Cl.
*G06F 3/04817* (2022.01)
*G06F 3/04883* (2022.01)

(52) U.S. Cl.
CPC ...... *G06F 3/04817* (2013.01); *G06F 3/04883* (2013.01)

(58) Field of Classification Search
CPC . G06F 3/04883; G06F 3/04817; G06F 3/0483
See application file for complete search history.

(56) References Cited

U.S. PATENT DOCUMENTS 10,521,104 B2 * 12/2019 Harada ................ G06F 3/0485
2011/0016396 A1 7/2011 Chaudhri
(Continued)

FOREIGN PATENT DOCUMENTS

| CN | 103793132 A | 5/2014 |
| CN | 104345887 A | 2/2015 |

(Continued)

OTHER PUBLICATIONS

CN Search Report dated Nov. 16, 2018 as received in Application No. 201810179182.1.
(Continued)

*Primary Examiner* — Mong-Shune Chung
(74) *Attorney, Agent, or Firm* — Maschoff Brennan (57) ABSTRACT

A display method and a mobile terminal are provided. The method includes: receiving a sliding operation of a user on a screen of a mobile terminal; determining a target response area on the screen of the mobile terminal, in response to the sliding operation; determining a target desktop page corresponding to the target response area from at least one desktop page of the mobile terminal, according to a correspondence relationship of response area and desktop page, where each response area corresponds to one desktop page; and controlling the screen to display the target desktop page.

8 Claims, 5 Drawing Sheets

(56) References Cited

U.S. PATENT DOCUMENTS

| | | | |
|---|---|---|---|
| 2011/0163967 A1 | 7/2011 | Chaudhri | |
| 2012/0036435 A1* | 2/2012 | Yang | G06F 3/0485 715/702 |
| 2013/0084920 A1* | 4/2013 | Sawhney | G06F 3/0481 455/566 |
| 2013/0135236 A1* | 5/2013 | Yano | G06F 3/0483 345/173 |
| 2014/0013254 A1* | 1/2014 | Hosein | G06F 3/04817 715/765 |
| 2017/0097715 A1* | 4/2017 | Kim | G06F 3/0483 |

FOREIGN PATENT DOCUMENTS

| | | |
|---|---|---|
| CN | 104793843 A | 7/2015 |
| CN | 105335089 A | 2/2016 |
| CN | 105892923 A | 8/2016 |
| CN | 106201278 A | 12/2016 |
| CN | 106227405 A | 12/2016 |
| CN | 106445350 A | 2/2017 |
| CN | 106775213 A | 5/2017 |
| CN | 107239194 A | 10/2017 |
| CN | 108415642 A | 8/2018 |
| EP | 2 7846 57 A2 | 10/2014 |
| WO | 2015/131816 A1 | 9/2015 |

OTHER PUBLICATIONS

Written Opinion of the International Searching Authority dated May 17, 2019 as received in Application No. PCT/CN2019/075184.
CN Office Action dated Oct. 29, 2019 as received in Application No. 201810119182.1.
CN Office Action dated Oct. 29, 2019 as received in Application No. 201810179182.1.
EP Search Report in Application No. 19764501.3 dated Mar. 24, 2021.

* cited by examiner

DISPLAY METHOD AND MOBILE TERMINAL

CROSS REFERENCE OF RELATED APPLICATION

The present application is the U.S. national phase of PCT Application PCT/CN2019/075184 filed on Feb. 15, 2019, which claims a priority of Chinese patent application No. 201810179182.1 filed on Mar. 5, 2018, which is incorporated herein by reference in its entirety.

TECHNICAL FIELD

The present disclosure relates to the field of electronic technology, in particular to a display method and a mobile terminal.

BACKGROUND

At present, there are specific ways for both a full-screen mobile phone and a mobile phone with a home button to return to desktops thereof, and returning to the desktop generally refers to returning to a default page, or refers to returning to a desktop page when entering an application. Generally, the form is relatively fixed.

However, with a development of electronic technology, mobile phones have become more and more advanced, and users have installed more and more applications on their phones. Accordingly, more and more contents are displayed on the mobile phone desktops. In this case, when returning to the desktop, the desktop page desired by the user is often not displayed in time, then the user needs to perform other operations to find the desktop page after returning to the desktop, so the user experience is poor.

SUMMARY

The present disclosure provides a display method and a mobile terminal, to solve the technical issue in the prior art that the desktop page desired by the user cannot be displayed in time when returning to the desktop.

To solve the above technical issue, a display method is provided in the present disclosure, including:

receiving a sliding operation of a user on a screen of a mobile terminal;

determining a target response area on the screen of the mobile terminal, in response to the sliding operation;

determining a target desktop page corresponding to the target response area from at least one desktop page of the mobile terminal, according to a correspondence relationship of response area and desktop page, where each response area corresponds to one desktop page; and controlling the screen to display the target desktop page.

In a first aspect, a mobile terminal is further provided in an embodiment of the present disclosure, including:

a receiving module, configured to receive a sliding operation of a user on a screen of a mobile terminal;

a first determining module, configured to determine a target response area on the screen of the mobile terminal, in response to the sliding operation;

a second determining module, configured to determine a target desktop page corresponding to the target response area from at least one desktop page of the mobile terminal, according to a correspondence relationship of response area and desktop page, where each response area corresponds to one desktop page; and a first controlling module, configured to control the screen to display the target desktop page.

In a second aspect, a mobile terminal is further provided in an embodiment of the present disclosure, including a processor, a memory and a computer program stored in the memory and executable on the processor, where the processor executes the computer program to perform the display method hereinabove.

In a third aspect, a computer-readable storage medium is further provided in an embodiment of the present disclosure, where a computer program is stored in the computer-readable storage medium, and a processor executes the computer program to perform the display method hereinabove.

According to the embodiment of the present disclosure, firstly the sliding operation of the user on the screen of the mobile terminal is received; a target response area on the screen of the mobile terminal is determined in response to the sliding operation; a target desktop page corresponding to the target response area is determined from at least one desktop page of the mobile terminal according to a correspondence relationship of response area and desktop page, where each response area corresponds to one desktop page; the screen is controlled to display the target desktop page. Therefore, when returning to the desktop, the user may directly enter the desktop page desired by the user without other operations, which is convenient and fast, thereby improving the user experience.

DETAILED DESCRIPTION

The technical solutions in the embodiments of the present disclosure will be clearly and completely described below in conjunction with the drawings in the embodiments of the present disclosure. Obviously, the described embodiments are part of the embodiments of the present disclosure, rather than all of them. Based on the embodiments of the present disclosure, all other embodiments obtained by those of ordinary skill in the art without creative work shall fall within the scope of the present disclosure.

Figure 1:
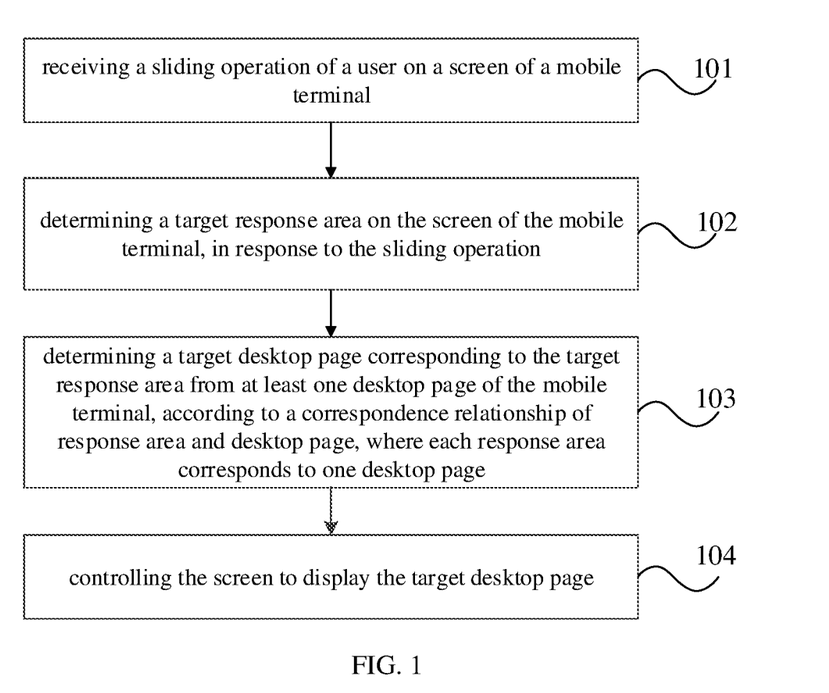
FIG. 1 is a flowchart of a display method in an embodiment of the present disclosure.

In some embodiments of the present disclosure, a display method is provided, as shown in FIG. 1, the display method includes:

Step 101: receiving a sliding operation of a user on a screen of a mobile terminal.

Here, by receiving the user's sliding operation on the screen of the mobile terminal, it is convenient to determine based on the sliding operation the target desktop page to be returned. At this time, the user can control the desktop page to be returned through the sliding on the screen.

Step 102: determining a target response area on the screen of the mobile terminal, in response to the sliding operation.

Here, the sliding operation is received, and in response to the sliding operation, the target response area on the screen of the mobile terminal is determined, so as to determine the corresponding target desktop page based on the target response area.

At least one response area may be determined on the screen, and the user may select a target response area in the at least one response area through a sliding operation, thereby determining the corresponding target desktop page based on the target response area.

The response area may be customized by the user or automatically determined by the system.

The sizes of the response areas may be the same or different, which may be determined by the users according to their needs. For example, a desktop page corresponding to a certain response area belongs to a desktop page commonly used by users, and has many applications that users frequently access, so the user may set the response area to be larger.

Figure 3:
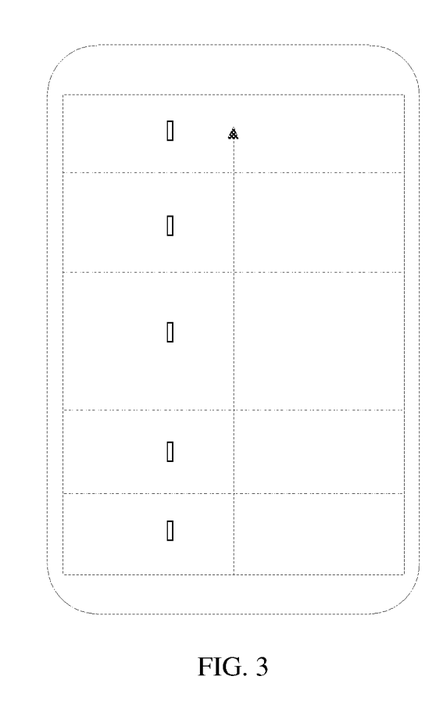
FIG. 3 is a schematic diagram of a division of response areas in a display method in an embodiment of the present disclosure.

For example, as shown in FIG. 3, 5 response areas ①, ②, ③, ④, and ⑤ are predetermined on the screen, and the user may select the target response area from these five response areas by a sliding operation.

Step 103: determining a target desktop page corresponding to the target response area from at least one desktop page of the mobile terminal, according to a correspondence relationship of response area and desktop page, where each response area corresponds to one desktop page.

Here, the correspondence relationship between the response area and the desktop page is preset, and each response area corresponds to one desktop page. According to this correspondence, it is able to quickly determine the target desktop page corresponding to the target response area from the at least one desktop page of the mobile terminal, that is, the desktop page that the user wants to return.

The correspondence relationship between the response area and the desktop page may be customized by the user, or may be automatically set by the system according to a predetermined rule. For example, the predetermined rule may be that: the screen is divided into multiple response areas from the bottom to the top, and the first response area (the bottom response area) corresponding to the first desktop page and the second response area corresponding to the second desktop page are arranged from the bottom to the top, and so on, the top response area corresponds to the last desktop page.

Step 104: controlling the screen to display the target desktop page.

Here, the control screen displays the target desktop page, that is, returning to and displaying the desktop page that the user wants to return, so that when returning to the desktop, the user may directly enter the desktop page desired by the user without other operations, which is convenient and quick.

According to the embodiment of the present disclosure, when returning to the desktop, the user may directly enter the desktop page desired by the user without other operations, which is convenient and fast, thereby improving the user experience.

Figure 2:
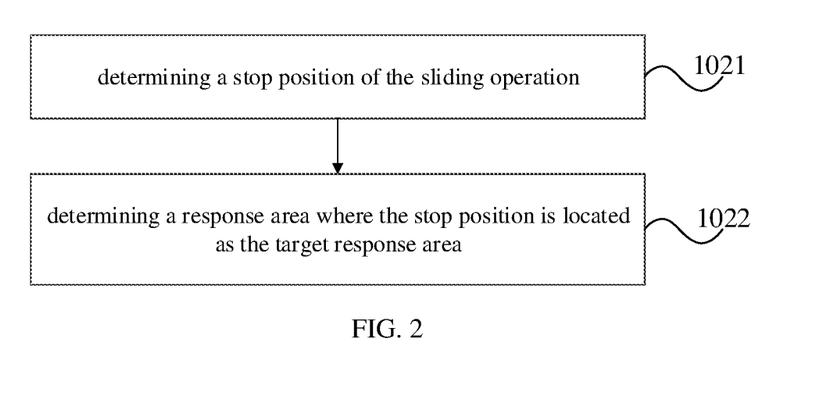
FIG. 2 is another flowchart of a display method in an embodiment of the present disclosure.

Optionally, as shown in FIG. 2, the Step 102 includes:

Step 1021: determining a stop position of the sliding operation.

Here, by determining the stop position of the sliding operation, that is, the stop position at the end of the sliding operation, it is convenient to determine the target response area based on the stop position.

Step 1022: determining a response area where the stop position is located as the target response area.

Here, by determining the response area where the stop position is located as the target response area, the target response area is accurately determined.

At this time, the user may conveniently and quickly select the target response area on the screen through the sliding operation, thereby selecting the target desktop page to be returned.

For example, as shown in FIG. 3, 5 response areas ①, ②, ③, ④, and ⑤ are predetermined on the screen, and each response area corresponds to one desktop page. When the stop position of the user's sliding operation on the screen is in the response area ③, the response area ③ is determined as the target response area. Assuming that the desktop page corresponding to the response area ③ is the third desktop page, when the sliding operation ends, the screen is controlled to display the third desktop page, so that when returning to the desktop, the user may directly enter the desktop page desired by the user without other operations, which is convenient and fast, thereby improving the user experience.

According to the embodiment of the present disclosure, the target desktop page corresponding to the sliding operation may also be determined in other ways. For example, the sliding distance of the sliding operation is determined, and the target desktop page corresponding to the sliding operation is determined from at least one desktop page of the mobile terminal according to the sliding distance of the sliding operation and the preset correspondence relationship between the sliding distance and the desktop page. Specifically, the correspondence relationship between the sliding distance and the desktop page includes a sliding distance threshold range corresponding to each desktop page. When the sliding distance of the sliding operation is within the sliding distance threshold range corresponding to a certain desktop page, the desktop page is determined as the target desktop page corresponding to the sliding operation.

Optionally, the Step 102 includes:

in the case that the adjustment function of returning to the desktop page is enabled, in response to the sliding operation, determining the target response area on the screen of the mobile terminal.

Here, when the adjustment function of returning to the desktop page is enabled, the sliding operation is responded to, and the target response area is determined, and the adjustment function of returning to the desktop page is activated to control the screen to return to and display the target desktop page desired by the user. If the adjustment function of returning to the desktop page is not enabled, the adjustment function of returning to the desktop page is not activated, and the default desktop page is returned for display in the original way. At this time, the user may enable and disable the adjustment function of returning to the desktop page at any time according to their own needs, which facilitates the user's operation and use.

A button for controlling the adjustment function of returning to the desktop page may be set, and the user may enable and disable the adjustment function of returning to the desktop page through the button.

Optionally, the method further includes:

Step 105: displaying, on the screen, prompt information of a desktop page corresponding to a response area.

At this time, by displaying the prompt information of the desktop page corresponding to the response area on the screen, the user may know the desktop page corresponding to each response area, thereby determining the target desktop page to be returned, which further facilitates the user's use.

Optionally, the Step 105 further includes:

Step 1051: during a sliding process, in the case that the sliding operation touches a response area, displaying, in the touched response area, the prompt information of the desktop page corresponding to the touched response area.

At this time, during the sliding process, the prompt information of the desktop page corresponding to each response area touched by the sliding operation is dynamically displayed on the screen, which is convenient for the user to know the desktop page corresponding to each response area passed by, which facilitates the user's use and improve the sense of technology.

Every time the prompt information of the desktop page corresponding to the currently-reached response area is displayed, the prompt information of the desktop page corresponding to the previously-reached response area may continue to be displayed, or the prompt information of the previously-reached response area will no longer be displayed.

For example, as shown in FIG. 3, 5 response areas ①, ②, ③, ④, and ⑤ are predetermined on the screen, and each response area corresponds to one desktop page. The user slides the screen from the bottom to the top. When the sliding operation touches the response area ①, the prompt information of the desktop page corresponding to the response area ① is displayed. If the sliding operation goes outside the response area ① and touches the response area, the prompt information of the desktop page corresponding to the response area ① will not be displayed, and the prompt information of the desktop page corresponding to the response area ② is displayed, and so on, and the display position moves up with the sliding operation, that is, the prompt information of each desktop page is displayed in the corresponding response area. The user stops sliding the screen after sliding to a certain extent, to control the screen to display the desktop page corresponding to the response area where the stop position of the sliding operation is located.

Optionally, the prompt information includes at least one of a thumbnail corresponding to the desktop page, a serial number icon corresponding to the desktop page and an application icon on the desktop page.

At this time, during the sliding process, the thumbnail, serial number icon or application icon on the desktop page is dynamically displayed on the screen, so that the user may know the desktop page corresponding to each response area, so as to determine the target desktop page desired to return.

When there are many applications in the system, users often cannot remember which desktop page the desired application is on. For this, the prompt information may include the serial number icon corresponding to the desktop page and the application icon on the desktop page. At this time, the user may clearly know the desktop page corresponding to each response area and the situation of the application corresponding to the desktop page, so as to determine which desktop page the desired application is on, that is, to determine the target desktop page to be returned.

Optionally, the application icons included in the prompt information are commonly used application icons on the desktop page determined in advance according to historical operation data and/or commonly used application icons on the desktop page preset by the user.

At this time, by displaying the commonly used application icons on the desktop page, the user may clearly know the status of the application of the desktop page, so as to determine which desktop page the desired application is on, and thus determine the target desktop page to be returned.

Figure 4:
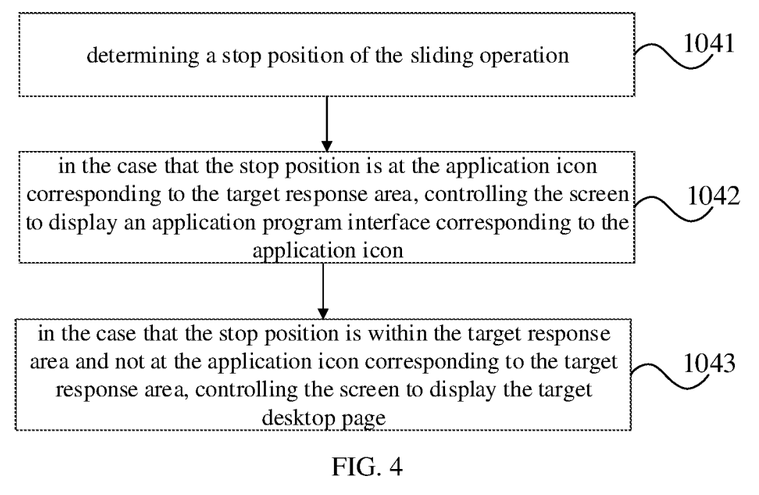
FIG. 4 is another flowchart of a display method in an embodiment of the present disclosure.

Optionally, the prompt information includes an application icon on the desktop page, as shown in FIG. 4, the above Step 104 includes:

Step 1041: determining a stop position of the sliding operation.

Here, by determining the stop position of the sliding operation, that is, the stop position at the end of the sliding operation, it is convenient to determine the content to be displayed based on the stop position.

Step 1042: in the case that the stop position is at the application icon corresponding to the target response area, controlling the screen to display an application program interface corresponding to the application icon.

Here, when the stop position is on the application icon, the screen is directly controlled to display the application program interface corresponding to the application icon. That is, when the icon of the application desired by the user is displayed in the prompt information of the desktop page on the screen, the application may be directly accessed through a sliding operation, which further facilitates the user's use.

For example, the user slide the screen from the bottom to the top. During the sliding process, the serial number icons and the commonly used application icons of the desktop pages corresponding to the response areas touched by the sliding operation are displayed on the screen in turn. When the commonly used application icon happens to be the icon of the application that the user wants to use, the user may slide onto the application icon and then end the sliding, then the screen may directly display the application interface corresponding to the application icon, which further facilitates the user's use.

Step 1043: in the case that the stop position is within the target response area and not at the application icon corresponding to the target response area, controlling the screen to display the target desktop page.

Here, when the stop position is within the target response area and not on the application icon, the screen is controlled to display the target desktop page, that is, returning to and displaying the desktop page that the user wants to return to, so that when returning to the desktop, the user may directly enter the desktop page desired by the user without other operations, which is convenient and quick.

It should be noted that the display method in the embodiment of the present disclosure may be applied to a mobile terminal without a virtual button on a full screen, and may also be applied to a mobile terminal provided with a physical or virtual home button.

When the display method is applied to a mobile terminal with no virtual buttons on the full screen, optionally, the screen of the mobile terminal includes a display area and a sliding button area below the display area, and the above Step 102 includes:

determining the target response area on the screen of the mobile terminal, in response to the sliding operation, in the case that the sliding operation is a sliding operation sliding from the sliding button area to the display area.

At this time, in the case that the sliding operation is a sliding operation sliding from the sliding button area to the display area, the target response area is determined in response to the sliding operation, thereby enabling the adjustment function of returning to the desktop page, and controlling the screen to return to and display the target desktop page desired by the user.

When the display method is applied to a mobile terminal provided with a physical or virtual home button, optionally, the above Step 102 includes:

in the case that the home button of the mobile terminal is in a long-pressed state, and the sliding operation is a sliding operation from the bottom of the screen display area of the mobile terminal to the top thereof, in response to the sliding operation, the target response area on the screen of the mobile terminal is determined.

At this time, when the physical or virtual home button of the mobile terminal is in the long-pressed state, and the sliding operation is a sliding operation from the bottom of the screen display area to the top thereof, in response to the sliding operation, the target response area is determined, and the adjustment function of returning to the desktop page is enabled, to control the screen returns to and display the target desktop page desired by the user.

To sum up, according to the display method in the embodiment of the present disclosure, it is able to directly enter the desktop page desired by the user without other operations when returning to the desktop, which is convenient and fast, thereby improving the user experience.

Figure 5:
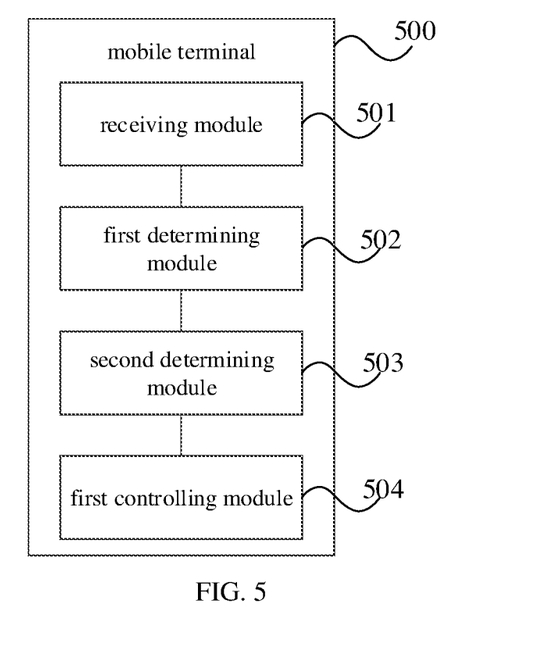
FIG. 5 is a schematic structural diagram of a mobile terminal in an embodiment of the present disclosure.

In some embodiments of the present disclosure, referring to FIG. 5, a mobile terminal 500 is further provided. The mobile terminal 500 includes:

a receiving module 501, configured to receive a sliding operation of a user on a screen of a mobile terminal;

a first determining module 502, configured to determine a target response area on the screen of the mobile terminal, in response to the sliding operation; and a second determining module 503, configured to determine a target desktop page corresponding to the target response area from at least one desktop page of the mobile terminal, according to a correspondence relationship of response area and desktop page, where each response area corresponds to one desktop page; and a first controlling module 504, configured to control the screen to display the target desktop page.

According to the mobile terminal 500 in the embodiment of the present disclosure, when returning to the desktop, the user may directly enter the desktop page desired by the user without other operations, which is convenient and fast, thereby improving the user experience.

Figure 6:
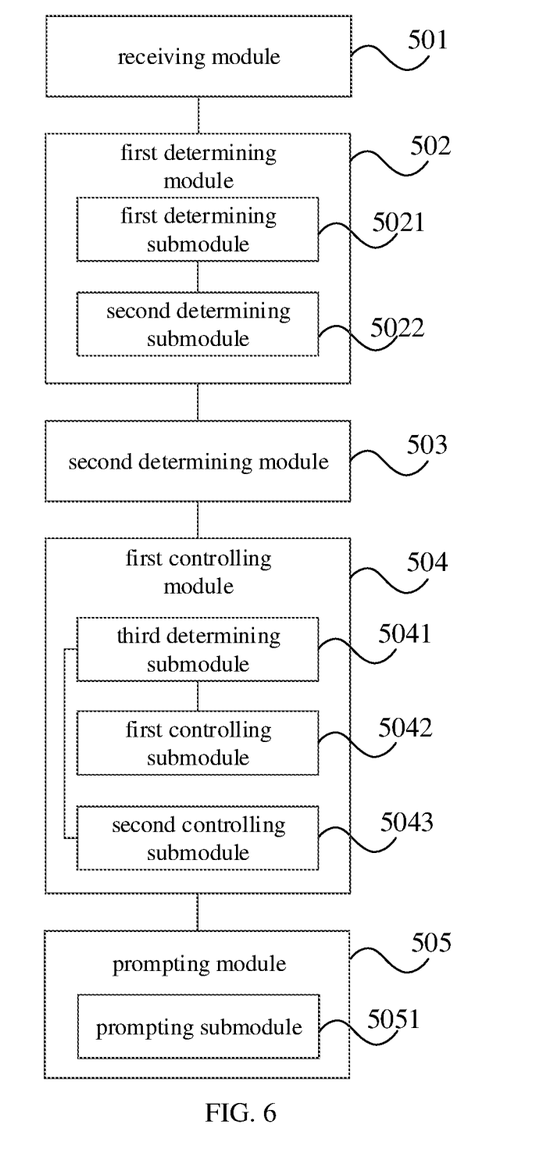
FIG. 6 is another schematic structural diagram of a mobile terminal in an embodiment of the present disclosure.

Optionally, as shown in FIG. 6, the first determining module 502 includes:

a first determining submodule 5021, configured to determine a stop position of the sliding operation; and a second determining submodule 5022, configured to determine a response area where the stop position is located as the target response area.

Optionally, the mobile terminal 500 further includes:

a prompting module 505, configured to display, on the screen, prompt information of a desktop page corresponding to a response area.

Optionally, the prompting module 505 includes:

a prompting submodule 5051, configured to, during a sliding process, in the case that the sliding operation touches a response area, display, in the touched response area, the prompt information of the desktop page corresponding to the touched response area.

Optionally, the prompt information includes at least one of a thumbnail corresponding to the desktop page, a serial number icon corresponding to the desktop page and an application icon on the desktop page.

Optionally, the prompt information includes the application icon on the desktop page, and the first controlling module 504 includes:

a third determining submodule 5041, configured to determine a stop position of the sliding operation;

a first controlling submodule 5042, configured to, in the case that the stop position is at the application icon corresponding to the target response area, control the screen to display an application program interface corresponding to the application icon;

a second controlling submodule 5043, configured to, in the case that the stop position is within the target response area and not at the application icon corresponding to the target response area, control the screen to display the target desktop page.

Optionally, the application icons included in the prompt information are commonly used application icons on the desktop page determined in advance according to historical operation data and/or commonly used application icons on the desktop page preset by the user.

Optionally, the first determining module 502 is further configured to:

in the case that the adjustment function of returning to the desktop page is enabled, in response to the sliding operation, determine the target response area on the screen of the mobile terminal.

Optionally, the screen of the mobile terminal includes a display area and a sliding button area below the display area, and the first determining module 502 is further configured to:

determine the target response area on the screen of the mobile terminal, in response to the sliding operation, in the case that the sliding operation is a sliding operation sliding from the sliding button area to the display area.

Optionally, the first determining module 502 is further configured to:

in the case that a home button of the mobile terminal is in a long-pressed state and the sliding operation is a sliding operation from the bottom of the screen display area of the mobile terminal to the top thereof, in response to the sliding operation, determine the target response area on the screen of the mobile terminal.

The mobile terminal in the embodiment of the present disclosure may implement each process implemented by the mobile terminal in the method embodiments of FIG. 1 to FIG. 4. To avoid repetition, details thereof are not described herein again. The mobile terminal 500 in the embodiment of the present disclosure may directly enter the desktop page desired by the user without other operations when returning to the desktop, which is convenient and fast, thereby improving the user experience.

Figure 7:
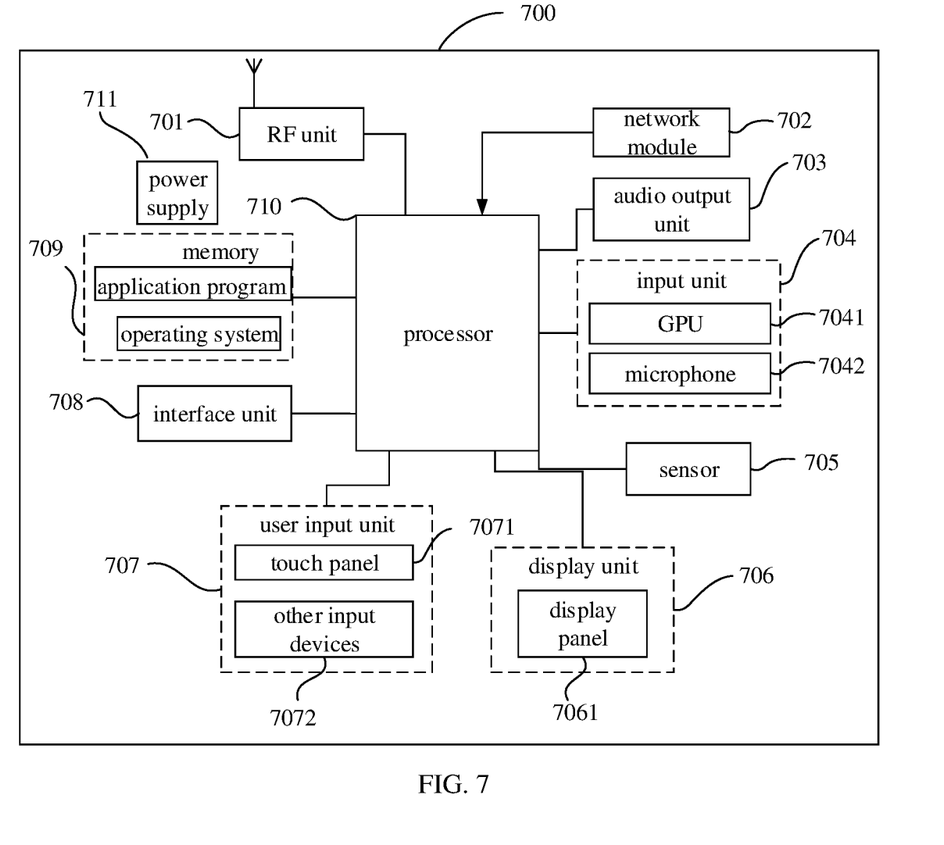
FIG. 7 is another schematic structural diagram of a mobile terminal in an embodiment of the present disclosure.

FIG. 7 is a schematic diagram of the hardware structure of a mobile terminal implementing various embodiments of the present disclosure. The mobile terminal 700 includes, but is not limited to: a radio frequency unit 701, a network module 702, an audio output unit 703, an input unit 704, a sensor 705, a display unit 706, a user input unit 707, an interface unit 708, a memory 709, a processor 710, and power supply 711 and other components. Those skilled in the art can understand that the structure of the mobile terminal shown in FIG. 7 does not constitute a limitation on the mobile terminal. The mobile terminal may include more or less components than those shown in the figure, or a combination of certain components, or an arrangement of different components. In the embodiment of the present disclosure, mobile terminals include, but are not limited to, mobile phones, tablet computers, notebook computers, palmtop computers, vehicle-mounted terminals, wearable devices, and pedometers.

The display unit 706 includes a screen.

The processor 710 is configured to: receive a sliding operation of a user on a screen of a mobile terminal; determine a target response area on the screen of the mobile terminal, in response to the sliding operation; and determine a target desktop page corresponding to the target response area from at least one desktop page of the mobile terminal, according to a correspondence relationship of response area and desktop page, where each response area corresponds to one desktop page; and control the screen to display the target desktop page.

The mobile terminal 700 may directly enter the desktop page desired by the user without other operations when returning to the desktop, which is convenient and fast, thereby improving the user experience.

Optionally, the processor 710 is further configured to: determine a stop position of the sliding operation, and determine a response area where the stop position is located as the target response area.

Optionally, the processor 710 is further configured to: display, on the screen, prompt information of a desktop page corresponding to a response area.

Optionally, the processor 710 is further configured to: during a sliding process, in the case that the sliding operation touches a response area, display, in the touched response area, the prompt information of the desktop page corresponding to the touched response area.

Optionally, the prompt information includes at least one of a thumbnail corresponding to the desktop page, a serial number icon corresponding to the desktop page and an application icon on the desktop page.

Optionally, the prompt information includes the application icon on the desktop page, the processor 710 is further configured to: determine a stop position of the sliding operation; in the case that the stop position is at the application icon corresponding to the target response area, control the screen to display an application program interface corresponding to the application icon; in the case that the stop position is within the target response area and not at the application icon corresponding to the target response area, control the screen to display the target desktop page.

Optionally, the screen of the mobile terminal includes a display area and a sliding button area below the display area, and the processor 710 is further configured to: determine the target response area on the screen of the mobile terminal, in response to the sliding operation, in the case that the sliding operation is a sliding operation sliding from the sliding button area to the display area.

It should be understood that, in the embodiment of the present disclosure, the radio frequency unit 701 can be used for receiving and sending signals in the process of sending and receiving information or talking. Specifically, the downlink data from the base station is received and processed by the processor 710; in addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 can also communicate with the network and other devices through a wireless communication system.

The mobile terminal provides users with wireless broadband Internet access through the network module 702, such as helping users to send and receive emails, browse web pages, and access streaming media.

The audio output unit 703 can convert the audio data received by the radio frequency unit 701 or the network module 702 or stored in the memory 709 into audio signals and output them as sounds. Moreover, the audio output unit 703 may also provide audio output related to a specific function performed by the mobile terminal 700 (for example, call signal reception sound, message reception sound, etc.). The audio output unit 703 includes a speaker, a buzzer, a receiver, and the like.

The input unit 704 is used to receive audio or video signals. The input unit 704 may include a graphics processing unit (GPU) 7041 and a microphone 7042. The graphics processing unit 7041 is configured to process the image data in the still pictures or video images obtained by an image capture device (such as a camera) in a video capture mode or an image capture mode. The processed image frame may be displayed on the display unit 706. The image frame processed by the graphics processor 7041 may be stored in the memory 709 (or other storage medium) or sent via the radio frequency unit 701 or the network module 702. The microphone 7042 can receive sound, and can process such sound into audio data. The processed audio data can be converted into a format that can be sent to a mobile communication base station via the radio frequency unit 701 for output in the case of a telephone call mode.

The mobile terminal 700 also includes at least one sensor 705, such as a light sensor, a motion sensor, and other sensors. Specifically, the light sensor includes an ambient light sensor and a proximity sensor. The ambient light sensor can adjust the brightness of the display panel 7061 according to the brightness of the ambient light. The proximity sensor can turn off the display panel 7061 and/or the backlight when the mobile terminal 700 is moved to the ear. As a kind of motion sensor, the accelerometer sensor can detect the magnitude of acceleration in various directions (usually three-axis), and can detect the magnitude and direction of gravity when stationary, and can be used to identify the posture of the mobile terminal (such as horizontal and vertical screen switching, related games, magnetometer attitude calibration), vibration recognition related functions (such as pedometer, percussion), etc.; sensor 705 can also include fingerprint sensors, pressure sensors, iris sensors, molecular sensors, gyroscopes, barometers, hygrometers, thermometers, Infrared sensors, etc., will not be repeated here.

The display unit 706 is used to display information input by the user or information provided to the user. The display unit 706 may include a display panel 7061, and the display panel 7061 may be configured in the form of a liquid crystal display (LCD), an organic light-emitting diode (OLED), etc.

The user input unit 707 may be used to receive inputted numeric or character information, and generate key signal input related to user settings and function control of the mobile terminal. Specifically, the user input unit 707 includes a touch panel 7071 and other input devices 7072. The touch panel 7071, also called a touch screen, can collect user touch operations on or near it (for example, the user uses any suitable objects or accessories such as fingers, stylus, etc. on the touch panel 7071 or near the touch panel 7071). The touch panel 7071 may include two parts: a touch detection device and a touch controller. The touch detection device detects the user's touch position, and detects the signal brought by the touch operation, and transmits the signal to the touch controller; the touch controller receives the touch information from the touch detection device, converts it into contact coordinates, and then sends it To the processor 710, the command sent by the processor 710 is received and executed. In addition, the touch panel 7071 can be implemented in multiple types such as resistive, capacitive, infrared, and surface acoustic wave. In addition to the touch panel 7071, the user input unit 707 may also include other input devices 7072. Specifically, other input devices 7072 may include, but are not limited to, a physical keyboard, function keys (such as volume control buttons, switch buttons, etc.), trackball, mouse, and joystick, which will not be repeated here.

Further, the touch panel 7071 can be overlaid on the display panel 7061. When the touch panel 7071 detects a touch operation on or near it, it is transmitted to the processor 710 to determine the type of the touch event. The type of event provides corresponding visual output on the display panel 7061. Although in FIG. 7, the touch panel 7071 and the display panel 7061 are used as two independent components to implement the input and output functions of the mobile terminal, in some embodiments, the touch panel 7071 and the display panel 7061 can be integrated The implementation of the input and output functions of the mobile terminal is not specifically limited here.

The interface unit 708 is an interface for connecting an external device with the mobile terminal 700. For example, the external device may include a wired or wireless headset port, an external power source (or battery charger) port, a wired or wireless data port, a memory card port, a port for connecting a device with an identification module, audio input/output (I/O) port, video I/O port, headphone port, etc. The interface unit 708 can be used to receive input (for example, data information, power, etc.) from an external device and transmit the received input to one or more elements in the mobile terminal 700 or can be used to connect to the mobile terminal 700 and external Transfer data between devices.

The memory 709 can be used to store software programs and various data. The memory 709 may mainly include a program storage area and a data storage area. The program storage area may store an operating system, an application program required by at least one function (such as a sound playback function, an image playback function, etc.), etc.; the data storage area may store data (such as audio data, phone book, etc.) created by the use of mobile phones. In addition, the memory 709 may include a high-speed random access memory, and may also include a non-volatile memory, such as at least one magnetic disk storage device, a flash memory device, or other volatile solid-state storage devices.

The processor 710 is the control center of the mobile terminal. It uses various interfaces and lines to connect the various parts of the entire mobile terminal. It runs or executes software programs and/or modules stored in the memory 709, and calls data stored in the memory 709 to perform various functions of the mobile terminal and process data, so as to monitor the mobile terminal as a whole. The processor 710 may include one or more processing units; preferably, the processor 710 may integrate an application processor and a modem processor, where the application processor mainly processes the operating system, user interface, and application programs. The processor mainly deals with wireless communication. It can be understood that the foregoing modem processor may not be integrated into the processor 710.

The mobile terminal 700 may also include a power source 711 (such as a battery) for supplying power to various components. Preferably, the power source 711 may be logically connected to the processor 710 through a power management system, so as to manage charging, discharging, and power consumption management and other functions through the power management system.

In addition, the mobile terminal 700 includes some functional modules not shown, which will not be repeated here.

In addition, a mobile terminal is further provided in an embodiment of the present disclosure, including a processor 710, a memory 709, and a computer program stored in the memory 709 and executable on the processor 710. The processor 710 executes the computer program to perform each process of the foregoing display method embodiment, and the same technical effect may be achieved. To avoid repetition, details thereof are not repeated here.

A computer-readable storage medium is further provided in an embodiment of the present disclosure, where a computer program is stored in the computer-readable storage medium, and a processor executes the computer program to perform each process of the above display method embodiment, and the same technical effect may be achieved. To avoid repetition, details thereof are not repeated here. The computer-readable storage medium may be, for example, read-only memory (Read-Only Memory, ROM), random access memory (Random Access Memory, RAM), magnetic disk, or optical disk, etc.

It should be noted that, in this article, the terms "include", "including" or any other variations thereof are intended to cover non-exclusive inclusion, so that a process, method, article or device including a series of elements not only includes those elements, It also includes other elements not explicitly listed, or elements inherent to the process, method, article, or device. If there are no more restrictions, the element defined by the sentence "including a . . . " does not exclude the existence of other same elements in the process, method, article or device that includes the element.

Through the description of the above embodiments, those skilled in the art can clearly understand that the method of the above embodiments can be implemented by means of software plus the necessary general hardware platform. Of course, it can also be implemented by hardware, but in many cases the former is better. Based on this understanding, the technical solution of the present disclosure essentially or the part that contributes to the existing technology can be embodied in the form of a software product, and the computer software product is stored in a storage medium (such as ROM/RAM, magnetic disk, The optical disc) includes several instructions to make a terminal (which may be a mobile phone, a computer, a server, an air conditioner, or a network device, etc.) execute the method described in each embodiment of the present disclosure.

The embodiments of the present disclosure are described above with reference to the drawings, but the present disclosure is not limited to the above-mentioned embodiments. The above-mentioned embodiments are only illustrative and not restrictive. For those of ordinary skill in the art are under the enlightenment of the present disclosure, without departing from the purpose of the present disclosure and the scope of the claims, many forms may be made, all of which fall within the scope of the present disclosure.

What is claimed is:

1. A mobile terminal, comprising: comprising a processor, a memory and a computer program stored in the memory and executable on the processor, wherein the processor executes the computer program to:

receive a sliding operation of a user on a screen of the mobile terminal;

determine, from at least one response area which is predetermined, a target response area on the screen of the mobile terminal, in response to the sliding operation;

determine a target desktop page corresponding to the target response area from at least one desktop page of the mobile terminal, according to a correspondence relationship of the at least one response area and the at least one desktop page, wherein each response area corresponds to one desktop page; and control the screen to display the target desktop page;

wherein the processor executes the computer program to:

display, on the screen, prompt information of the at least one desktop page corresponding to the at least one response area;

wherein the prompt information comprises at least one of a thumbnail corresponding to the desktop page, a serial number icon corresponding to the desktop page and an application icon on the desktop page;

wherein the prompt information comprises the application icon on the desktop page, and the processor executes the computer program to:

determine a stop position of the sliding operation;

in the case that the stop position is at the application icon corresponding to the target desktop page corresponding to the target response area, control the screen to display an application program interface corresponding to the application icon; and in the case that the stop position is within the target response area and not at the application icon corresponding to the target desktop page corresponding to the target response area, control the screen to display the target desktop page.

2. The mobile terminal according to claim 1, wherein the processor executes the computer program to:

determine a stop position of the sliding operation; and determine the response area, among the at least one response area, where the stop position is located as the target response area.

3. The mobile terminal according to claim 1, wherein the processor executes the computer program to:

during a sliding process, in the case that the sliding operation touches one of the at least one response area, display, in the touched response area, the prompt information of the desktop page corresponding to the touched response area.

4. The mobile terminal according to claim 1, wherein the screen of the mobile terminal comprises a display area and a sliding button area below the display area, and the processor executes the computer program to:

determine the target response area on the screen of the mobile terminal, in response to the sliding operation, in the case that the sliding operation is a sliding operation sliding from the sliding button area to the display area.

5. A display method, applied to the mobile terminal according to claim 1.

6. The display method according to claim 5, wherein the determining, from at least one response area which is predetermined, the target response area on the screen of the mobile terminal in response to the sliding operation, comprises:

determining a stop position of the sliding operation; and determining the response area, among the at least one response area, where the stop position is located as the target response area.

7. The method according to claim 5, wherein the displaying on the screen the prompt information of the desktop page corresponding to the response area comprises:

during a sliding process, in the case that the sliding operation touches one of the at least one response area, displaying, in the touched response area, the prompt information of the desktop page corresponding to the touched response area.

8. The method according to claim 5, wherein the screen of the mobile terminal comprises a display area and a sliding button area below the display area, and the determining, from at least one response area which is predetermined, the target response area on the screen of the mobile terminal in response to the sliding operation, comprises:

determining the target response area on the screen of the mobile terminal, in response to the sliding operation, in the case that the sliding operation is a sliding operation sliding from the sliding button area to the display area.

\* \* \* \* \*